United States Patent [19]
Khanna

[11] 3,960,979
[45] June 1, 1976

[54] HIGH SOLIDS CAN COATING COMPOSITIONS BASED ON EPOXY RESIN CROSSLINKING AGENT, FLEXIBILIZING POLYOL, CO-REACTIVE ACID CATALYST, AND SURFACE MODIFIER

[75] Inventor: Ram Tirth Khanna, Linden Heath, Del.

[73] Assignee: E. I. Du Pont de Nemours and Company, Wilmington, Del.

[22] Filed: Dec. 24, 1974

[21] Appl. No.: 536,323

[52] U.S. Cl. ............................... 260/834; 260/14; 260/15; 260/824 EP; 260/826; 260/831; 260/835; 260/836
[51] Int. Cl.$^2$ .............................. C08L 63/00
[58] Field of Search ................ 260/834, 835, 836

[56] References Cited
UNITED STATES PATENTS

| | | | |
|---|---|---|---|
| 2,528,360 | 10/1950 | Greenlee | 260/834 X |
| 2,591,539 | 4/1952 | Greelee | 260/834 X |
| 3,158,584 | 11/1964 | Layman | 260/22 |
| 3,198,850 | 8/1965 | Levantin | 260/834 |
| 3,551,517 | 12/1970 | Dowbenko et al. | 260/834 |
| 3,651,169 | 3/1972 | Davis | 260/834 |
| 3,719,618 | 3/1973 | Makhlouf | 260/21 |
| 3,813,254 | 5/1974 | Makhlouf | 117/12 |
| 3,871,896 | 3/1975 | Matsudaira et al. | 260/834 X |

OTHER PUBLICATIONS

Chem. Absts.: 127,471R vol. 79, "Epoxy Resin Compositions", Tajima et al.
Chem. Absts.: 59871y: vol. 78, "Highly Deformable Polyester Coatings On Steel", Schade et al.
Chem. Absts.: 114923c: vol. 76, "Coating Compositions Containing Epoxide Compounds," Inami et al.

*Primary Examiner*—Donald E. Czaja
*Assistant Examiner*—Edward Woodberry

[57] ABSTRACT

A fast curing high solids coating composition that is useful for coating the interiors of cans and a method of applying such high solids coatings to the interiors of food and beverage cans by spraying from a hot-melt spray gun are the subject of this invention; the coating composition is a blend of:

A. a low molecular weight epoxy resin,
B. a liquid nitrogen resin or phenolic crosslinking agent,
C. a flexibilizing polyol,
D. an inorganic or organic monomeric or polymeric acid which acts both as reactant and catalyst, and optionally
E. a surface modifier;

and can be rapidly cured by heating at a temperature and for a time sufficient to substantially complete the crosslinking reaction.

14 Claims, No Drawings

HIGH SOLIDS CAN COATING COMPOSITIONS BASED ON EPOXY RESIN CROSSLINKING AGENT, FLEXIBILIZING POLYOL, CO-REACTIVE ACID CATALYST, AND SURFACE MODIFIER

BACKGROUND OF THE INVENTION

This invention is related to a thermosetting coating composition and in particular to a polymeric coating composition that is useful for finishing metallic substrates.

The can manufacturing industry is utilizing cans customarily made from aluminum or steel, coated on their interior by a thin coating designed to protect the metal walls from attack by food or beverage to be stored therein. Such coating should have among other properties good adhesion to the metal walls, low extractables to prevent taste adulteration, and a rapid cure rate for an economical manufacturing process. The coatings of the prior art can be classified generally as vinyls, butadienes, epoxies, alkyd/urea-formaldehyde, and oleoresinous products. They are most commonly applied at a solids content below 40%.

The coating composition of this invention combines the desired properties of low extractability, fast cure, and flexibility with low application viscosity at high solids content. These high solids or, if desired, solventless two composition liquid systems can be mixed continuously in line prior to roller coating or spraying or batch premixed for one component application.

SUMMARY OF THE INVENTION

According to the present invention there is provided a high solids coating composition, applicable to the interior of food or beverage cans, consisting essentially of
A. 30–65 parts of a low molecular weight epoxy resin,
B. 10–35 parts of a liquid nitrogen resin or phenolic crosslinking agent,
C. 20–40 parts a flexibilizing polyol,
D. 0.5–10 parts of an inorganic or organic monomeric or polymeric acid which acts both as reactant and catalyst, and
E. 0–2 parts of a surface modifier,
wherein all components are by weight based on the total of (A) plus (B) plus (C) plus (D) plus (E) and can be rapidly cured by heating at a temperature and for a time sufficient to substantially complete the crosslinking reaction. Optionally, the composition can include stabilizing agents, pigments, fillers, wetting agents, and colorants.

DESCRIPTION OF THE INVENTION

The present invention is directed to improved thermosetting coating compositions and particularly to coatings applicable in the can manufacturing industry. These coatings have general utility in metal finishing areas.

In order to achieve the desired balance of properties in a high solids coating, i.e. non-volatile content of at least 70% and up to 100%, cure rate of at least 190° seconds at 205°C and preferably 140 seconds at 177°C, and manageable application viscosity at the application temperature, i.e. less than 100 centipoises for spray coating, the coating of the present invention comprises low molecular weight crosslinkable epoxy resins, mixtures or modifications thereof.

The low molecular weight epoxy resins to be utilized in the present invention are commonly known in the art. One class of such resins has the generalized formula

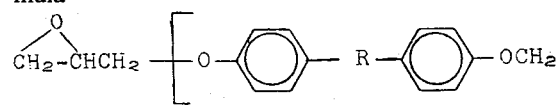

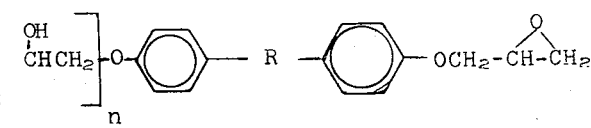

where for purposes described above $n$ is an integer from 0–6 and R is an alkylene group of 1–4 carbon atoms. The epoxy resins utilized in the present invention contain at least two epoxy groups per molecule and therefore, upon curing of the composition, introduce no uncrosslinked extractable portions into the coating. Such extractables would have deleterious effects on the flavor of the contents of the can. Also, by reason of the presence of at least two epoxy groups per epoxy resin molecule and of the absence of solvent diluents the rate of curing of the composition of the present invention is increased. This increase in cure rate is known in the art as the Tromsdorff or gel effect described in "Principles of Polymer Chemistry" by Paul Flory, Cornell University Press, Ithaca, New York, 1953, pages 160–161 and 214–217.

One preferred epoxy resin is "Epon 826" where the average value of $n$ is 0, R is isopropylidene, the viscosity of the undiluted resin is 65–95 poises at 25°C as measured by ASTM-D-445, and has an epoxy equivalent of 180–188. The epoxy equivalent is defined as the grams of resin containing 1 gram-equivalent of epoxide as measured by ASTM-D-1652. The coating composition containing "Epon 826" has exceptional elevated temperature and corrosion resistance properties. Another preferred epoxy resin is "Epon 1001" whose average $n$ value is between two and three, R is isopropylidene, has a melting point of 65°–75°C, and an epoxy equivalent of 450–550. Coating compositions containing "Epon 1001" have excellent chemical resistance.

Modifications of epoxy resins can also be utilized in the coating composition of the present invention. It is known to those skilled in the art that when a compound containing an epoxy group is brought in contact with an oxy-acid there results an ester or mixture of esters. Thus, for example, when phosphoric acid is added to an epoxy resin, reaction occurs at one or more of the epoxy groups of the molecule and the resulting mixture contains both the mono-and diesters of phosphoric acid. A product of this reaction is exemplified by the formula

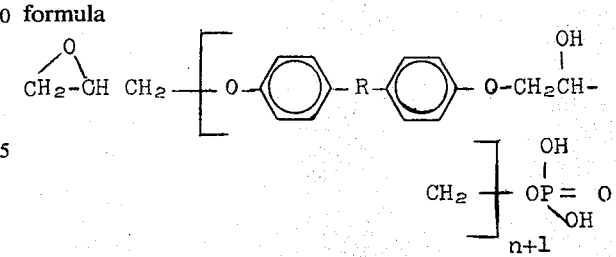

These modified epoxy resins can still function as epoxy resins in the coating compositions and/or fulfill the role of the reactive catalyst to be described below.

The coating composition of this invention utilizes nitrogen resins such as melamine-formaldehyde or phenolic resins as the crosslinking agents for the epoxy resins. Typically, these crosslinking agents are the products of the reactions of melamine, urea or phenol with formaldehyde and various alcohols containing up to and including 4 carbon atoms. Preferred members of this class are the methylated melamine-formaldehyde resins such as hexamethoxymethylmelamine. These liquid crosslinking agents have substantially 100% non-volatile content as measured by the foil method at 45°C for 45 minutes. For the purposes of this invention it is important not to introduce extraneous diluents that would lower the final solids content of the coating. The hexamethoxymethylmelamines also offer fast rates and high efficiency of cure and result in coatings of high gloss and excellent chemical resistance.

Utilization of the peralkoxymethylated melamines is also preferred over the partially reacted melamines because the rate of reaction of, for example, the hexamethoxymethylmelamine with polymers containing reactive functional groups, as for example the hydroxyl groups of the epoxy resin, is approximately 20 times as fast as the self-condensation reaction. With partially alkoxymethylated melamines and melamine-formaldehyde the rate of self-condensation is of the same order of magnitude as the rate of crosslinking with the polymer. If significant portions of the crosslinking resin were to be consumed through self-condensation, then the epoxy resins and the flexibilizing polyols, to be described below, would remain uncrosslinked and extractable leading to taste adulteration by the can coating.

Another preferred crosslinking agent to be utilized in the coating composition of this invention is "Cymel 1156", a mixed alkoxyalkyl melamine-formaldehyde resin, designed for efficient crosslinking of polymers containing reactive functional groups such as hydroxyl or carboxyl groups. Because of its hydrophilic-hydrophobic balance, coatings prepared with this crosslinking agent show exceptional resistance to aqueous extraction. This property makes "Cymel 1156" exceptionally useful as a crosslinking agent for interior can coatings.

A further essential ingredient of the coating composition of this invention comprises a polyol such as a polyester polyol, a monomeric polyol or a polyether polyol having an average of at least two hydroxyl groups per molecule. The polyester polyols are fully saturated products prepared from aliphatic dibasic acids containing 2–20 carbon atoms such as succinic acid, glutaric acid, adipic acid, azelaic acid and short chain glycols of up to and including twelve carbon atoms such as ethylene glycol, 1,2-propylene glycol, 1,3-propylene glycol, 1,2-butylene glycol, 1,3-butylene glycol, 1,4-butylene glycol, neopentyl glycol, 1,4-cyclohexanedimethanol, 1,6-hexamethylene glycol, and 2-ethyl-2-methyl-1,3-propanediol; their molecular weight range is from about 200 to about 3500 and the hydroxyl number range is from about 30 to about 230. The hydroxyl number is defined as the number of milligrams of potassium hydroxide needed, for each gram of sample, to neutralize the acetic acid generated during the reaction between the polyols and excess acetic anhydride. The polyesters utilized in this invention are low melting, soft waxy solids which are easily maintained in the molten state. When viscosity measurements are carried out at 60°C a range of about 50 to about 3500 centipoises is found. This limited crystallinity of the polyesters is designed to impart processing ease and flexibility to the coating composition upon co-reaction with the above described crosslinking agents.

Among the preferred polyesters are products derived from the esterification of ethylene glycol and 1,4-butanediol with adipic acid, ethylene glycol and 1,2-propylene glycol with adipic acid, dimer acid and sebacic acid copolyester diols, and mixtures thereof. These copolyester diols, when utilized at the 20 to 40 part by weight level, based on the total weight of the coating, yield readily processable coating formulations which cure to a flexible high quality enamel.

Among the useful polyether polyols are polytetramethylene ether glycol, polyethylene glycol, polypropylene glycol, and the like. Such polyether glycols have a useful molecular weight range of 500 to 4000. Examples of monomeric polyols are diethylene glycol, triethylene glycol, dipropylene glycol, trimethylol ethane, trimethylol propane, sorbitol, tetramethylene glycol, and the like.

The curing of the components of the coating composition of this invention can be effected by acid catalysis. The acid catalyst is so chosen that during the catalytic process it co-reacts with and becomes permanently bound to the other components of the coating composition. This mode of operation for the catalyst is designed to alleviate the problem of water sensitivity that is common to compositions of the prior art utilizing acid catalysts which remain unchanged in the coating after the cure. The presence of such catalysts imparts water sensitivity and also creates a problem of extractability.

Catalysts utilized in the coating composition of this invention can be either inorganic acids or organic carboxylic acids. Examples of the former are phosphoric acid and sulphuric acid while organic acids are exemplified by citric acid, tartaric acid, lactic acid, maleic acid, itaconic acid or the phthalic acids. Furthermore, esters of the aforementioned acids can also be utilized, for example, alkyl, cycloalkyl or aryl esters of phosphoric acid or adducts derived from phosphoric acid and epoxy resins, as hereinabove defined, are useful. Esters of citric, tartaric, lactic, itaconic or maleic acids are also effective catalysts for the curing of the coating composition of this invention. For example, monoesters prepared with alcohols characterized by the structure $HOCH_2R'$, where $R'$ is hydrogen, an alkyl group of up to and including five carbon atoms or $CHOR''$, where $R''$ is hydrogen or an alkyl group of up to and including four carbon atoms, such as methyl or hexyl alcohol, ethylene glycol or a monoalkyl ether of ethylene glycol, are among useful catalysts.

Use of these co-reactive catalysts affords rapid cure-times. The coating compositions can be cured in a single baking cycle at temperatures of 80° to 210°C for 1 to 10 minutes. Alternatively, these coatings can also be subjected to a prebake at temperatures of 40° to 100°C for 1 to 10 minutes to facilitate flow-out, followed by a final baking cycle at 80° to 210°C for 1 to 10 minutes.

The coating compositions of this invention optionally include a wetting agent or surface modifier. While the exact mode of operation of these surface modifiers is not known, it is thought that their presence contributes to better adhesion of the coating composition to the metal surface and helps the formation of uniform thin coatings on the metal. These surface modifiers are exemplified by acrylic polymers containing 0.1–10% by weight of a copolymerized mono-ethylenically unsaturated carboxylic acid, such as methacrylic acid, acrylic acid or itaconic acid, cellulose acetate butyrate, silicone oils or mixtures thereof.

The choice of surface modifier is dependent upon the type of surface to be coated. A preferred surface modifier for steel is an acrylic terpolymer of the following composition: methyl methacrylate/ethyl acrylate/acrylic acid in the approximate weight ratio of 38:56:6. Another preferred surface modifier for steel is cellulose acetate butyrate.

In some cases, on certain substrates and especially in coatings formulated at the very high solids content of about 95 to 100%, the surface modifier may not be necessary. A preferred embodiment for a coating composition to be utilized on aluminum, where an epoxy resin, a liquid melamine-formaldehyde crosslinking agent, a polyester diol, and an acid catalyst make up 95% of the total coating composition, contains no surface modifier.

The solvents utilized in the coating composition of this invention are those commonly utilized. Typical solvents useful in the coating compositions facilitate spray application at high solids content. They include toluene, xylene, methyl ethyl ketone, acetone, 2-ethoxy-1-ethanol, 2-butoxy-1-ethanol, diacetone alcohol, tetrahydrofuran, ethyl acetate, dimethyl succinate, dimethyl glutarate, dimethyl adipate or mixtures thereof.

The coating composition of this invention can be applied by conventional methods known to those in the art. These methods include roller coating, spray coating, dipping or brushing. In a preferred embodiment of this invention the coating composition to be utilized in can coating is roller coated onto the substrate prior to curing. In another preferred embodiment the coating composition to be utilized in interior can coating is spray coated through the nozzle of a spray gun.

The interior can coatings of the prior art most commonly comprise a one package system at low solids content. Conventional spray coating equipment suffers from the limitation that thermosetting compositions can only be applied at relatively low solids content since the heating required to maintain the more viscous higher solids systems at a sprayable viscosity causes premature crosslinking.

The coating composition of this invention, by virtue of its low application viscosity at high solids content, can be applied by an improved process. This improved process comprises the hydraulic pressure pumping of the premixed or the in-line mixed two-package system through a heated head and nozzle to the interior of the cans. The line pressure is from about 34 to about 238 atmospheres and the temperature of the heated head is from 40° to 150°C. Thermal curing of the coating completes the process. The components of the coating composition are blended prior to application into a two-package system. The choice of components for the two parts of the coating composition is only restricted insofar that the acid catalyst and the mixture of the melamine-formaldehyde resin and the epoxy resin may undergo some spontaneous reaction prior to application.

The can manufacturing industry utilizes mainly metallic cans made from aluminum, tin-free steel (TFS), electrolytic tin-plate (ETP), and quality-as-received (QAR) basic steel plate, among others. Cans utilized for packaging and shipping food and beer or other beverages are mostly of the three-piece or the two-piece drawn-and-ironed (D and I) variety. Cans constructed from three pieces, the body, top, and bottom can be roller coated before the metallic sheet is formed into the body of the can or can be spray coated after partial fabrication. The D and I cans, where the metal sheet is stamped to form a cylindrical body closed at one end, are generally spray coated.

Those of ordinary skill in the art can utilize the coating composition of this invention in a variety of applications and on many different substrates. This novel coating composition finds particular utility in the can industry where it can be applied to the interior of two-piece drawn and ironed and three-piece beer and beverage cans, to the exterior of three-piece beer and beverage cans, to the interior and/or exterior ends of two- or three-piece cans or to two- or three-piece sanitary cans. When the coating composition of this invention is applied to the interior of food and beer or beverage cans by spray-coating a thin uniform film is deposited which, after curing, corresponds to a coating weight of 150 to 800 milligrams per can. This quantity can be reduced to from 150 to 350 milligrams per can by electrostatic atomization of the droplets of the coating at the end of the nozzle. Conventional interior can coating processes of the prior art deposit approximately 100 to 200 milligrams per can, but this lower coating weight is achieved only by depositing the coating from a dilute solution followed by a lengthy, energy consuming, and polluting curing process.

After application and curing the coating compositions of this invention are tested for their adhesion to the substrate, for uniformity of film coverage, for pasteurization resistance, for flexibility, for resistance to boiling water, and for solvent resistance. For a coating to be useful in interior can coating, it must pass all of these tests.

The following are the procedures for the above described tests. All tests are carried out on test panels coated and curing according to the conditions hereinabove described.

Adhesion:
Number 610 "Scotch" tape is placed over a scribed "X" on the test panel, followed by rapid pull-off. For a coating to be acceptable no more than very slight "picking" is allowed.

Film Coverage:
A. A sample of the coated panel is immersed into an aqueous solution containing copper sulfate and HCl in a weight ratio of 20 parts to 10 parts, dissolved in 70 parts of water, for two minutes. For the coating to be acceptable there must not be any copper deposits at a coating thickness not exceeding five-hundredths of a millimeter. Freedom from copper deposits indicates that the coating is free of pinholes.

B. A sample coated can is filled with an electrolyte. A low voltage is applied between an electrode immersed in the electrolyte and the can body. The presence of metal exposure is detected by a flow of current as indicated on a meter. The magnitude of current which will flow is related to the total area of metal exposed to the electrolyte. A low reading on the meter, below 1.0, indicates good film coverage.

Pasteurization Resistance:

A sample of a coated panel is immersed in water at 68°C for 30 minutes. For a coating to be acceptable there must be no blistering, softening or loss of adhesion; only a light "blush" is allowed.

Boiling Water Resistance:

A coated panel is immersed in boiling water for 30 minutes. Again, no blistering, softening or loss of adhesion is permitted and only a slight "blush" is allowed.

Flexibility:

A coated panel is subjected to 180° bending. No cracking of the film or loss of adhesion should take place for the coating to be acceptable.

Solvent Resistance:

A sample coated panel is mechanically rubbed 100 times with cloth soaked in methyl ethyl ketone. A passing sample will show no dissolution of, delamination of or penetration through the film by the solvent after 100 strokes.

The invention can be further understood by referring to the following examples in which parts and percentages are by weight unless otherwise indicated.

EXAMPLE 1 a. In a suitable vessel, equipped with thermometer, stirrer, condenser, and a nitrogen inlet, are placed the following materials: ethylene glycol, 47.0 grams, 1,2-propylene glycol, 19.0 grams, adipic acid, 138.7 grams, 0.02 gram of phosphoric acid, and 0.005 gram of tetra-isopropyl titanate (available from E. I. du Pont de Nemours and Co. under the trade name of Tyzor TPT). The contents of the vessel are heated at approximately 200°C until the acid number is reduced to one or below. This takes approximately 5 hours. The product polyester diol, poly (ethylene 1,2-propylene adipate) has a hydroxyl number of 205, viscosity at 60°C of 110 centipoises, and a molecular weight of 1120.

b. A coating composition is prepared in two parts. In part A there are mixed 7.0 parts of the polyester diol, prepared in (a) above, and 0.8 part of 85% phosphoric acid. In part B are mixed 7 parts of a liquid diepoxy resin, known as "Epon 826", of viscosity approximately 80 poises and an epoxide equivalent of approximately 185, 6.0 parts of hexamethoxymethylmelamine, and 0.1 part of cellulose acetate butyrate (available from Eastman Chemical Products, Inc., as EAB-551-0.02). When part A and part B are mixed together and baked at 205°C for two minutes a thermoset product results. The 100% solids system of this example can be roller coated on, for example, an aluminum sheet and cured into a thin, glossy film. At a film thickness of 0.002–0.005 millimeter (0.1–0.2 mil) the coating passes the boiling water and solvent resistance and flexibility tests.

EXAMPLE 2 a. To a 5000-milliliter round-bottomed three-necked flask add 394.5 grams of 85% phosphoric acid and 200 grams of 2-butoxy-1-ethanol. Slowly add a solution of 1500 grams of "Epon 1001" in 945.5 grams of 2-butoxy-1-ethanol over a one-hour period. Stir for an additional 30 minutes. The resultant adduct has a viscosity of 13,000 centipoises at 60% solids.

b. Example 1 (b) is repeated whereby the phosphoric acid of part A is replaced with 1.6 parts of the epoxy resin-phosphoric acid adduct prepared in (a) above. Upon mixing parts A and B, casting the blend at a 96% solids content (diluted with 2-butoxy-1-ethanol) on a steel panel, and baking at 205°C for two minutes, a glossy, crosslinked film results. At a film thickness of 0.002–0.005 millimeter (0.1–0.2 mil) the coating passes the boiling water and solvent resistance and flexibility tests.

EXAMPLE 3 a. In a suitably equipped reaction vessel is placed approximately 20% of the following solution: methyl methacrylate, 684 grams, ethyl acrylate, 1008 grams, acrylic acid, 108 grams, benzoyl peroxide, 5.4 grams, iso-propanol, 231 grams, 2-methoxy-1-ethanol, 540 grams. The contents of the reaction vessel are heated to 105°C under a nitrogen purge. The remaining 80% of the above described solution is then added to the reaction vessel over a three-hour time period. The contents of the reaction vessel are maintained at 105°C for an additional approximately one hour. The resulting polymer has a composition methyl methacrylate/ethyl acrylate/acrylic acid //38/56/6. The polymer has a number average molecular weight of 30,000 and a weight average molecular weight of 84,000 as determined by gel permeation chromatography.

b. Thirty five parts of the polyester diol of Example 1(a) is melted at 60°C. To the molten polyester diol is added 4.0 parts of 85% phosphoric acid and 0.1 part of the acrylic terpolymer prepared in (a) above, dissolved in methyl ethyl ketone. To this mixture is added 35.0 parts of "Epon 826" and 30.0 parts of hexamethoxymethylmelamine dissolved in methyl ethyl ketone. To the total mix is added sufficient methyl ethyl ketone to obtain a 60% solids solution which is spray-coated onto a steel panel.

c. The formulation described in (b) above is mixed in a feed tank and pumped to 136 atmospheres (2000 pounds per square inch) through a high pressure air-driven pump to a specially designed hot-melt spray gun. The hot-melt gun was modified from that used in conventional hot-melt application to permit using thermosetting compositions. The modified spray gun has the following features: Minimal material hold up in the heated section of the gun; non-circulating material flow through the heated part of the gun, although external recirculation is possible; air-actuated nozzle control for uniform atomization and for sharp "tail-free" cut-off; and by-pass line for purging the gun when not in use.

The can to be coated is rotated on its axis at a speed of about 2000 revolutions per minute. The gun is mounted on an indexing table and its nozzle is adjusted to ensure complete coverage of the interior of the can. The gun is actuated by an electronically operated air-solenoid for 90 milli-seconds. When a 12-ounce D and I can is used, curing at 205°C for 2 minutes results in a dry coating weighing 470 mg. When the gun is actuated for 50 milli-seconds the cured coating weight is 250 milligrams per can.

Alternatively, a two-component meter-mix pumping equipment can be used with the hot-melt gun where components A and B are mixed together shortly before or in the spray gun. This coating passes the boiling water and solvent resistance and the flexibility tests. When film coverage is tested with the enamel rater, a reading of 0.3 is obtained.

EXAMPLE 4 a. The process of Example 1(a) was repeated, using the following ingredients: ethylene glycol, 37 grams, 1,4-butylene glycol, 37 grams, and adipic acid, 139 grams. At the end of the reaction the product poly- (ethylene 1,4-butylene adipate) has an acid number of 0.8, molecular weight of 804, and a hydroxyl number of 139.

b. Into a 1000-milliliter round-bottomed flask, equipped with air stirrer, thermometer, and a condenser with a take-off head, are placed citric acid, 210.1 grams, ethyl alcohol, 46.1 grams, and phosphoric acid (85%), 2.6 grams. The contents of the vessel are heated to reflux and maintained between 100° and 130°C for approximately 40 minutes, during which time an ethanol-water distillate is collected. At the end of the reaction a total of 10 grams of water is collected. The viscosity of the final product at room temperature is approximately 200,000 centipoises. The product is a mono-ethyl ester of citric acid.

c. The following components are mixed together as part A of a coating composition: 3.0 parts of the phosphoric acid-diepoxy resin adduct described in Example 2(a), 25.5 parts of the poly(ethylene 1,4-butylene adipate) polyester diol prepared in (a) above, mono-ethyl citrate, prepared in (b) above, 4.3 parts, and 1.0 part of the acrylic terpolymer of methyl methacrylate/ethyl acrylate/acrylic acid, described in Example 3(a). The following components are mixed together as part B of the coating composition: the diepoxy resin "Epon 826", 12.8 parts and "Epon 1001", epoxide equivalent of approximately 500, 44.2 parts. dissolved in 11.1 parts of 2-butoxy-1-ethanol, and hexamethoxymethylmelamine, 15.0 parts. When the mixture of parts A and B is diluted to 80% solids content with toluene the coating composition can be applied with a coating knife. Baking at 205°C for two minutes results in a thermoset coating 0.002–0.005 millimeter thick. An aluminum panel coated with the thermoset film of this example remains smooth and unmarred after the above-described test for solvent resistance. Placing the coated panel in boiling water for 30 minutes did not affect film quality and the film showed no cracks.

What is claimed is:

1. A high solids coating composition consisting essentially of
   A. 30–65 parts by weight, based on the components (A), (B), (C), (D), and (E), of an epoxy resin containing at least two epoxy groups per molecule and having a molecular weight not exceeding 2,500;
   B. 10–35 parts by weight, based on components (A), (B), (C), (D), and (E), of a nitrogen resin crosslinking agent;
   C. 20–40 parts by weight, based on the components (A), (B), (C), (D), and (E), of a polyol, selected from the group consisting of: polyester polyol and polyether polyol, having a minimum of two hydroxyl groups per molecule, a molecular weight range of 100–4000, and a hydroxyl number range of 15–560;
   D. 0.5–10 parts by weight, based on the components (A), (B), (C), (D), and (E), of at least one acid catalyst capable of co-reacting with and becoming permanently bound to components (A) and/or (C) of said coating composition selected from the group consisting of
      1. phosphoric acid;
      2. an alkyl, cycloalkyl or aryl mono-ester containing up to and including 7 carbon atoms, of phosphoric acid; and
      3. a mono-adduct of phosphoric acid and an epoxy resin containing at least two epoxy groups per molecule and having a molecular weight not exceeding 2,500; and
   E. 0–2 parts by weight, based on the components (A), (B), (C), (D), and (E), of an acrylic polymer surface modifier containing 0.5–10% by weight, based on the weight of the polymer, of acrylic acid, methacrylic acid or itaconic acid.

2. The coating composition of claim 1 wherein the epoxy resin of (A) is of the formula

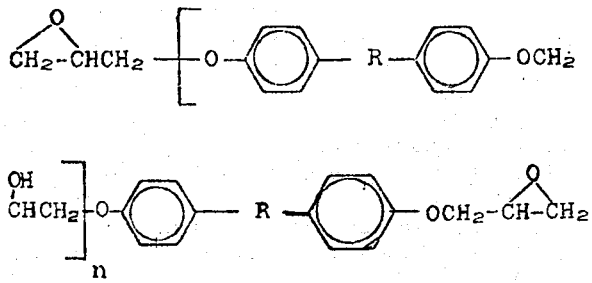

wherein $n$ is an integer from 0–6 and R is an alkylene group of 1–4 carbon atoms and having a molecular weight range of 300 to 2200.

3. The coating composition of claim 1 wherein the nitrogen resin crosslinking agent of (B) is a liquid melamineformaldehyde resin.

4. The coating composition of claim 1 wherein the polyol of (C) is a polyester polyol prepared from at least one saturated aliphatic dicarboxylic acid of 2–20 carbon atoms and at least one glycol of 2–12 carbon atoms, said polyester polyol having a molecular weight range of 200 to 3,500 and a hydroxyl number range of 30–230.

5. The coating composition of claim 1 wherein the polyol of (C) is a polyether polyol having a molecular weight range of 500 to 4,000 and a hydroxyl number range of 15 to 115.

6. The coating composition of claim 4 wherein the polyester polyol is prepared from at least one saturated aliphatic dicarboxylic acid selected from the groups consisting of:
   1. succinic acid
   2. glutaric acid
   3. adipic acid, and
   4. azelaic acid and at least one glycol selected from the group consisting of
   1. ethylene glycol
   2. 1,2-propylene glycol
   3. 1,3-propylene glycol
   4. 1,2-butylene glycol
   5. 1,3-butylene glycol
   6. 1,4-butylene glycol
   7. neopentyl glycol
   8. 1,4-cyclohexanedimethanol
   9. 1,6-hexamethylene glycol, and
   10. 2-ethyl-2-methyl-1,3-propanediol.

7. The coating composition of claim 5 wherein the polyether polyol is at least one member of the group consisting of poly(tetramethylene ether glycol), poly(ethylene glycol), and poly(propylene glycol).

8. A high solids coating composition consisting essentially of
   A. 30–65 parts by weight, based on the components (A), (B), (C), (D), and (E), of an epoxy resin of formula

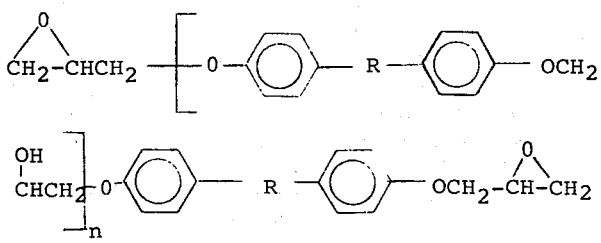

wherein n is an integer from 0–6 and R is an alkylene group of 1–4 carbon atoms and having a molecular weight range of 300 to 2,200;

B. 10–34 parts by weight, based on the components (A), (B), (C), (D), and (E), of a liquid melamine-formaldehyde crosslinking agent;

C. 20–40 parts by weight, based on the components (A), (B), (C), (D, and (E), of a polyester diol prepared from at least one saturated aliphatic dicarboxylic acid selected from the group consisting of
1. succinic acid
2. glutaric acid
3. adipic acid, and
4. azelaic acid and at least one glycol selected from the group consisting of
   1. ethylene glycol
   2. 1,2-propylene glycol
   3. 1,3-propylene glycol
   4. 1,2-butylene glycol
   5. 1,3-butylene glycol
   6. 1,4-butylene glycol
   7. neopentyl glycol
   8. 1,4-cyclohexanedimethanol
   9. 1,6-hexamethylene glycol, and
   10. 2-ethyl-2-methyl-1,3-propanediol having a molecular weight range of 200 to 3500 and a hydroxyl number range of 30 to 230;

D. 0.5–10 parts by weight, based on the components (A), (B), (C), (D), and (E), of at least one acid catalyst capable of co-reacting with and becoming permanently bound to components (A) and/or (C) of said coating composition selected from the group consisting of
1. phosphoric acid
2. mono-adduct of phosphoric acid and an epoxy resin containing at least two epoxy groups per molecule and having a molecular weight not exceeding 2,500; and E. 0–2 parts by weight, based on the components (A), (B), (C), (D), and (E), of a surface modifier wherein said surface modifier is an acrylic polymer containing 0.5–10% by weight, based on the weight of the polymer, of an acrylic acid, methacrylic acid or itaconic acid.

9. The coating composition of claim 8 wherein said liquid melamine-formaldehyde resin is hexamethoxymethylmelamine.

10. The coating composition of claim 4 wherein the polyester polyol is poly(ethylene 1,4-butylene adipate) having a molecular weight range of 700 to 2,000 and a hydroxyl number range of 30 to 230.

11. The coating composition of claim 4 wherein the polyester polyol is poly(ethylene 1,2-propylene adipate) having a molecular weight range of 800 to 3,000 and a hydroxyl number range of 30 to 230.

12. The coating composition of claim 9 wherein the acid catalyst is phosphoric acid.

13. A high solids coating composition consisting essentially of
A. 30–40 parts by weight, based on the components (A), (B), (C), (D), and (E), of an epoxy resin containing on the average two epoxy groups per molecule and having a molecular weight range of 320–700;
B. 25–35 parts by weight, based on the components (A), (B), (C), (D), and (E), of hexamethoxymethylmelamine;
C. 30–40 parts by weight, based on the components (A), (B), (C), (D), and (E), of poly(ethylene 1,2-propylene adipate) having a molecular weight range of 800–1,400 and a hydroxyl number range of 140 to 230;
D. 2–8 parts by weight, based on the components (A), (B), (C), (D), and (E), of phosphoric acid, a mono-adduct of phosphoric acid and an epoxy resin containing at least two epoxy groups per molecule and having a molecular weight not exceeding 2,500 or mixtures thereof;
E. 0.1–1 part by weight, based on the components (A), (B), (C), (D), and (E), of an acrylic polymer surface modifier containing 0.5–10% by weight, based on the weight of the polymer, of acrylic acid, methacrylic acid or itaconic acid.

14. A high solids coating composition consisting essentially of
A. 50–65 parts by weight, based on the components (A), (B), (C), (D), and (E), of at least one epoxy resin containing on the average two epoxy groups per molecule and having a molecular weight range of 320–1,200;
B. 10–20 parts, by weight, based on the components (A), (B), (C), (D), and (E), of hexamethoxymethylmelamine;
C. 20–30 parts by weight, based on the components (A), (B), (C), (D), and (E), of poly(ethylene 1,4-butylene adipate) having a molecular weight range of 700 to 1,000 and a hydroxyl number range of 100–200;
D. 2–8 parts by weight, based on the components (A), (B), (C), (D), and (E), of phosphoric acid, a mono-adduct of phosphoric acid and an epoxy resin containing at least two epoxy groups per molecule and having a molecular weight not exceeding 2,500 or mixtures thereof; and
E. 0.1–1 part by weight, based on the components (A), (B), (C), (D), and (E), of an acrylic polymer surface modifier containing 0.5–10% by weight, based on the weight of the polymer, of acrylic acid, methacrylic acid or itaconic acid.

* * * * *